United States Patent [19]

Surash et al.

[11] Patent Number: 5,008,020

[45] Date of Patent: Apr. 16, 1991

[54] TREATMENT OF DOMESTIC AND INDUSTRIAL WASTE WATERS

[75] Inventors: Robert G. Surash, Rochester; Gary G. Kiehl, Holton, both of N.Y.

[73] Assignee: Eastman Kodak Company, Rochester, N.Y.

[21] Appl. No.: 447,944

[22] Filed: Dec. 8, 1989

[51] Int. Cl.$^5$ .................................. C02F 1/66
[52] U.S. Cl. ........................ 210/751; 405/129; 423/DIG. 20
[58] Field of Search ............. 210/702, 710, 723, 724, 210/726, 912, 751; 405/129; 423/DIG. 20

[56] References Cited

U.S. PATENT DOCUMENTS

| | | | |
|---|---|---|---|
| 3,428,558 | 2/1969 | Murphy | 210/59 |
| 3,429,693 | 2/1969 | Bauer et al. | 75/101 |
| 3,692,671 | 9/1972 | Recht et al. | 210/726 |
| 3,801,499 | 4/1974 | Luck | 210/11 |
| 3,812,032 | 5/1974 | Chappell | 210/52 |
| 3,915,853 | 10/1975 | Luck | 210/11 |
| 3,963,637 | 6/1976 | Chappell | 252/181 |
| 4,565,612 | 1/1986 | Fry | 210/702 |
| 4,764,284 | 8/1988 | Jansen | 210/715 |

FOREIGN PATENT DOCUMENTS

| | | | |
|---|---|---|---|
| 49-11810 | 3/1974 | Japan | 210/726 |
| 50-79169 | 6/1975 | Japan | 210/912 |

*Primary Examiner*—Peter Hruskoci
*Attorney, Agent, or Firm*—Robert A. Gerlach

[57] ABSTRACT

Waste waters are treated by mixing with a metal bicarbonate and a metal carbonate in amounts sufficient to affect solidification.

7 Claims, No Drawings

TREATMENT OF DOMESTIC AND INDUSTRIAL WASTE WATERS

BACKGROUND OF THE INVENTION

1. Field of the Invention

This invention relates to a method of treating demestic and industrial waste waters and more particularly to a method of placing waste waters in condition for subsequent purification treatments.

2. Description of Related Arts

Numerous treating techniques for the purification of waste waters have beem employed as commercial treating methods and even more numerous processes have been disclosed in the prior art for accomplishing this purpose. These processes, however, do not address the problems facing domestic water consumers located in areas where sewers are not employed, particularly around lakes and other bodies of water where septic drainage systems are not permitted by law, nor do they address the problems confronting small manufacturers of various materials where the treatment of their waste water discharge is just not economically feasible on the site. Further, there is generally no procedures available for treating certain wastes which may have been stored by various techniques permitted in the past, but which are now prohibited by law. In certain instances, there are prohibitions by various governmental bodies, against transporting liquid toxic containing materials. Regardless of the source of the materials whether they are found in abandon landfills, are generated in the production of conventional products or the like, a danger exists in the transport of these materials in liquid form to a site where treatment can be performed in order to render them environmentally harmless.

U.S. Pat. No. 4,764,284 issued Aug. 16, 1988, teaches a method of removing heavy metals from water by passing the heavy metal containing water waste through a fluidized bed containing alkali metal carbonates or hydrogen carbonates containing seed crystals of the metal being removed wherein the formed heavy metal carbonates crystallize on the bed seed material.

U.S. Pat. No. 3,812,032 issued May 21, 1974 and U.S. Pat. No. 3,963,637 issued Jun. 15, 1976, the latter being a division of the former, suggest a process and composition respectively for flocculating liquid wastes wherein amongst other things, the composition may include small quantities of alkali metal carbonates and bicarbonates.

U.S. Pat. No. 3,801,499 issued Apr. 2, 1974 and U.S. Pat. No. 3,915,853 issued Oct. 28, 1975, the latter being a continuation-in-part of the former, suggests a method of treating liquid sewage containing inorganic and organic components to precipitate out heavy metals by adding alkali metal carbonates, bicarbonates, hydroxides or mixtures thereof. The material added is in relative small quantities. This treatment is followed by subsequent treatment to render the sewage water suitable for drinking.

U.S. Pat. No. 3,429,693 issued Feb. 25, 1969 teaches the extraction of beryllium, vanadium, molybdenum, or tungsten from silicon, aluminum, iron or calcium present as gangue values in ores or concentrations of these metals with an aqueous extracting solution containing sodium carbonate and sodium bicarbonate in a molar ratio of 1:1 and having a concentration of from about 1 to 50% by weight.

U.S. Pat. No. 3,428,558 issued Feb. 18, 1969 relates to a composition and method for treating water by utilizing carbon dioxide releasing components including ammonium and alkali metal carbonates and bicarbonates to disperse high molecular weight water soluble polymers which are employed to clarify the water.

While these various references deal with specific methods of treating or purifying water generally and in some cases waste water specifically, they do not at all relate to the problem being dealt with in this specification nor do they offer a solution thereto. In most, if not all, waste water treating facilities are only economical when large quantities of water are being purified to the point where the effluent can be discharged into naturally occurring bodies of water such as streams, rivers and lakes. In situations where small quantities of materials are being handled, it is not economically feasible for each of the facilities to treat their waste to bring about this result. Therefore, the waste must be collected in a suitable fashion to prevent possible harm to the environment and physically moved to a facility specifically designed for handling such waste materials.

Local ordinances and state and federal statutes specify the manner and means by which various waste materials can be stored, handled, transported and the like. In rural areas not having public sewage systems, local ordinances set forth the requirements for the handling of waste water particularly with regard to riparian homeowners. In many cases, septic drainage fields are not permitted because of the possibility that the effluent from the drainage field will leak into the river, lake or other body of water. The waste water is first subjected to the action of a septic tank and then held in a hold tank until it is carted away in a suitable tank truck vehicle to be disposed of by various methods. This is not always the most desirable technique employed because of the possibility of spillage and possible environmental pollution problems that result therefrom.

In small facilities, such as small manufacturing, chemical, synthesis or various treating facilities, such as tanning shops and the like, various materials that are used in the facility or generated at by products in the facility must be properly disposed of whether that entails treatment at the site or by transporting to another facility or specialty company that can properly treat the waste material to render it harmless. Depending upon the nature of the waste material, there may be prohibitions against transporting the material while in the liquid form and therefore, there is a need for converting the waste into a solid form in order that it may be transported to the site for further treatment.

A need also arises where toxic chemicals are discovered in landfill sites or other places where they represent a hazard. Perhaps they were placed years ago before environmental considerations were addressed or before the enactment of legislation controlling such sites or perhaps they were placed illegally. However, regardless how the material got to the particular point, it requires attention and most cases must be transported to a suitable facility for treatment to render it harmless. Thus, in the situations enumerated herein which are only a few of the possible sources of waste materials, there is a definite need for handling waste material without endangering the environment.

SUMMARY OF THE INVENTION

The invention provides a method of treating waste water by mixing with a metal bicarbonate and a metal carbonate wherein the weight ratio of the bicarbonate to the carbonate is from about 1/3 to about 3/1, and the total weight of the bicarbonate and the carbonate are from about 1 to about 3 parts per part of the waste water material being treated. By mixing these large quantities of carbonate and bicarbonate with the waste water, a solid in particulate form results that is readily conveyed by standard techniques. It can be pumped through conduits, it can be vacuumed and moved by any of the techniques commonly employed regarding particulate solids. Further, if the form of the waste is not in a water medium, regardless of the solubility of the waste in water it can be either dissolved or dispersed in water and treated as above to solidify the water solution of dispersion thereof.

DETAILED DESCRIPTION OF THE PREFERRED EMBODIMENTS

Thus, the invention contemplates the solidification into a granular particulate form of any type of waste material which is either in the form of water base liquid or which can be put in such form either by dispersion or solution in water. For example, in the application previously mentioned, that being the handling of sewage in a rural environment particularly around bodies of water where the sewage is trucked from the home sites, rather than haul off the sewage in the liquid form, it could be first treated with the carbonate in accordance with this invention to particularize the sewage that is more readily handled thus avoiding the possibility of spillage.

In the case of a manufacturing or chemical plant facility which is too small to economically justify a waste treating facility on site, and particularly where the waste material is of a nature where there are prohibitions against transporting it in the liquid form, the material can be treated in accordance with this invention and then trucked to a suitable waste facility for further treatment to render the waste harmless. In a situation where the waste material is not in a water solution or dispersion, the material can first be mixed by any suitable type mixing apparatus with water in order to convert it into a water medium for operation in accordance with this invention. The material would then be mixed with the proper proportion of carbonate and bicarbonate depending upon the total weight of the solution or dispersion thereby converting it to a particulate material suitable for transport in accordance with the existing ordinances and statutes.

In the operation as described above, the total quantity of bicarbonate and carbonate used is in the amount of at least equal parts by weight as that of the waste water being treated. Preferably, the quantity of the two carbonates are employed in an amount of from 1 to 3 part of waste liquid. Most preferably, two parts of the carbonate and bicarbonate per part of the waste water are employed. The two carbonates are utilized in a ratio of bicarbonate to carbonate of from about 1:3 to about 3:1. Preferably, the two carbonates are employed in equal parts by weight.

The carbonate and bicarbonate employed in the process of this invention may be any of the metal carbonates and bicarbonates wherein the metal is a group Ia or IIa of the Periodic Chart of the Elements as published in the Ninth Edition of "The Merck Index". However, the carbonates and bicarbonates of sodium, potassium and calcium are preferred for economic reasons. Sodium carbonate and sodium bicarbonate are the most preferred materials.

The bicarbonate and carbonate may be added to the waste water in any order, however, it is preferred that the bicarbonate be added initially and the carbonate second. In one embodiment of the invention, the mixing of the bicarbonate and the carbonate with the waste water can take place in a batch mixer equipped with a stirrer wherein the water is added at one port and the bicarbonate and carbonate are added from two separate ports to the container, stirring continued until the proper portions of each of the ingredients are introduced. The material within the container rapidly solidifies into a particulate form which can then be easily removed from the mixer either by dumping or by having an exit discharge means in the lower extremities of the mixing device which can be opened.

In a continuous process for conducting the process in accordance with this invention, an extruder like device may be employed wherein the waste water material enters the near the back the screw of the extruder, the bicarbonate is introduced shortly thereafter and the carbonate introduced into a port slightly downstream from that of the carbonate. The screw of the extruder is either a single screw or double screw type extrusion device that rotate within the barrel of the extruder thereby moving the material to the outlet where it is collected in powder form. While extruders are normally thought of as having small orifices relative to the barrel of the extruder, in the device suitable for this technique the outlet orifice need only be of a size sufficient to permit the proper mixing of the various components in the barrel. Other apparatus such as, for example, Banbury mixers commonly employed in the resin manufacture business are also suitable for practice of this invention.

In a specific embodiment of this invention, 500 pounds of discharge water from a small laboratory paper making facility is introduced into a 2000 gallon kettle equipped with a stirring mechanism. Stirring is initiated and 750 pounds of sodium bicarbonate are added during stirring. Immediately following the addition of the sodium bicarbonate 750 pounds of sodium carbonate are added and stirring continued until the material within the kettle forms a granular particulate material, at which time the contents of the kettle are removed. The coarse grain sand-like material can then be transported by any suitable carrier to a treating facility that specializes in the treatment of such waste water materials.

What is claimed is:

1. A method of treating waste water which comprises mixing the waste water with a metal bicarbonate and a metal carbonate, the weight ratio of bicarbonate to carbonate being from about 1/3 to about 3/1, the total weight of bicarbonate and carbonate being from about 1 to 3 parts per part of waste water wherein said waste water solidifies into a particulate form.

2. The method of claim 1 wherein the bicarbonate is selected from the group consisting of sodium bicarbonate, potassium bicarbonate and calcium bicarbonate.

3. The method of claim 2 wherein the bicarbonate is sodium bicarbonate.

4. The method of claim 1 wherein the carbonate is selected from the group consisting of sodium carbonate, potassium carbonate and calcium carbonate.

5. The method claim 4 wherein the carbonate is sodium carbonate.

6. The method of claim 1 wherein the weight ratio of bicarbonate to carbonate is 1.

7. The method of claim 6 wherein the total weight of bicarbonate and carbonate per part of waste water is 2.

* * * * *